United States Patent Office 2,994,719
Patented Aug. 1, 1961

2,994,719
PRODUCTION OF BIS($\alpha,\alpha$-DIMETHYLBENZYL) PEROXIDE
Adalbert Farkas, Wallingford, and Rudolph Rosenthal, East Lansdowne, Pa., assignors to Allied Chemical Corporation, New York, N.Y., a corporation of New York
No Drawing. Filed Dec. 16, 1958, Ser. No. 780,685
10 Claims. (Cl. 260—610)

This invention is directed to a process for the production of bis($\alpha,\alpha$-dimethylbenzyl) peroxide by the catalytic reaction of $\alpha,\alpha$-dimethylbenzyl hydroperoxide dispersed in cumene in the presence of a salt of cobalt and an organic acid, which salt is in solution in the cumene.

It is known, U.S.P. 2,691,683, issued October 12, 1954, to heat a pure $\alpha,\alpha$-dimethylbenzyl hydroperoxide in a nitrogen atmosphere at 106°–132° C. to obtain a bis ($\alpha,\alpha$-dimethylbenzyl) peroxide product amounting to a 27 weight percent yield of peroxide from the hydroperoxide supplied to the process. Of this conversion of the hydroperoxide to the peroxide, it is said that it must be carried out in the absence of heavy metal compounds which catalyze decomposition of the hydroperoxide to compounds of lower molecular weight, and of compounds having a tertiary hydrocarbon radical which undergo reaction with hydroperoxides leading to the formation of tertiary alcohols, particularly in the presence of heavy metal catalysts. Oxygen is also preferably excluded from the system in which the hydroperoxide is heated.

Despite these teachings of the prior art, we have now discovered that cobalt catalyzes the transformation of $\alpha,\alpha$-dimethylbenzyl hydroperoxide into the peroxide under certain reaction conditions to give surprisingly high yields of the peroxide.

In operating in accordance with our invention, $\alpha,\alpha$-dimethylbenzyl hydroperoxide is dispersed in a solution of a cobalt salt in cumene containing about .01% to about .05% by weight of Co at a temperature in the range of about 85° C. to about 110° C. No more than about one part by weight of the hydroperoxide is thus dispersed in every one part cumene. The reaction mixture thus prepared is maintained at reaction temperature in this range of about 85° C. to about 110° C. until substantially all of the hydroperoxide which has been dispersed in the solution of cobalt salt in cumene has reacted. The resulting reaction product contains bis($\alpha,\alpha$-dimethylbenzyl) peroxide formed from the $\alpha,\alpha$-dimethylbenzyl hydroperoxide and is treated by any suitable method for recovery of the peroxide from mixtures containing it together with other materials formed by thermal decomposition of $\alpha,\alpha$-dimethylbenzyl hydroperoxide.

A preferred method for operating in accordance with our invention involves preparing a solution of a cobalt salt in cumene containing about .02% to about .05% by weight of Co. To this solution at a temperature of about 85° C. to about 110° C., $\alpha,\alpha$-dimethylbenzyl hydroperoxide is slowly added and is dispersed in the solution. Preferably the hydroperoxide is introduced as a solution in cumene since this facilitates both control of the rate of addition of the hydroperoxide to the catalyst solution and its dispersal in that solution. Since it is desirable to maintain the composition of the reaction mixture substantially uniform as respects the distribution in it of the hydroperoxide, and this becomes increasingly difficult as the rate of mixing the solutions of hydroperoxide and catalyst is increased, it is preferred to mix the hydroperoxide with the solution containing the catalyst at a rate not substantially greater than about 50 parts hydroperoxide per 100 parts cumene solution of the catalyst (both by weight) per hour. Additional cobalt salt is added as may be necessary to maintain the concentration of Co in the reaction mixture in the above range of about .01% to about .05%. This additional catalyst is also preferably introduced as a solution of the cobalt salt in cumene.

When substantially all of the hydroperoxide added has reacted, preferably when no more than about 5% of the total hydroperoxide added remains in the reaction mixture as hydroperoxide, the resulting reaction mixture is treated to recover the bis($\alpha,\alpha$-dimethylbenzy) peroxide. In a continuously operating process in which hydroperoxide is supplied to a pool of reaction mixture and product withdrawn therefrom, this preferred operation involves maintaining a residence time of material in the pool such that the hydroperoxide content in the withdrawn material does not exceed about 5% of the hydroperoxide in the feed to the pool during a unit time interval of operation. In a batch operation, depending upon the rate of addition of the hydroperoxide to the catalyst solution and the temperature maintained, the required substantially complete reaction of the hydroperoxide may be attained by the time the hydroperoxide addition is completed, or it may require maintaining the reaction mixture at reaction temperature for a period of time following completion of the hydroperoxide addition.

The bis($\alpha,\alpha$-dimethylbenzyl) peroxide produced by the foregoing process may be recovered by distilling the reaction product under a vacuum, for example of about 1 mm. Hg pressure, to remove cumene and by-products boiling below the peroxide. The residue is mixed with an alcohol, such as methanol or ethanol, in amount sufficient to dissolve the peroxide at room temperature. The solution is cooled to a temperature of about (—30)° C. to crystallize the peroxide which is filtered off separate from impurities soluble in the alcohol. By re-solution of the crystals of peroxide in alcohol, decolorizing the solution by activated carbon, filtering and cooling the solution to recrystallize the peroxide, a substantially pure bis($\alpha,\alpha$-dimethylbenzyl) peroxide may be recovered by separating the crystals from the mother liquor and drying them.

Our invention is further illustrated by the following examples. In these examples, quantities of materials stated as parts or percentages are by weight. In all of the examples the reaction mixture was heated in a vessel fitted with a reflux condenser to return to the reaction mixture liquid vaporized therefrom, at the elevated temperatures employed for the reaction. No precautions were taken to exclude oxygen from the reaction mixture. Dispersion of the materials added to those already in the reaction vessel was promoted by stirring the contents of the vessel.

*Example 1.*—2.2 parts cobalt stearate, containing about 0.20 part Co, and 650 parts cumene were heated to 90° C. To this catalyst solution 243 parts of a 78.3% $\alpha,\alpha$-dimethylbenzyl hydroperoxide material and 0.3 part of cobalt stearate, containing about .028 part Co, dissolved in 100 parts cumene were added drop-wise over a 2-hour period, keeping the temperature of the reaction mixture at about 95° C. After completion of the addition of the hydroperoxide and supplemental catalyst solution, the reaction mixture was heated for a further period of 3 hours at 95° C. At the end of this time more than 96% of the hydroperoxide had decomposed.

The reaction product was distilled under a reduced pressure of about 1 mm. Hg, taking off overhead material boiling lower than the peroxide. The residue was taken up in methanol and the liquor cooled in a Dry Ice-acetone bath to crystallize out the peroxide. These crystals were redissolved in methanol, the solution decolorized by addition of activated carbon, filtered and cooled, to crystallize out the peroxide. A substantially pure bis ($\alpha,\alpha$-dimethylbenzyl) peroxide, in 58% yield based on the hydroperoxide supplied to the process, was thus obtained.

In this process, the concentration of Co catalyst in the reaction mixture ranged from 0.03% at the start to 0.025% at the end of the addition of the hydroperoxide. The ratio by weight of hydroperoxide to cumene supplied to the process was about 0.24/1. The overall rate of mixing hydroperoxide with the catalyst solution was about 12 parts hydroperoxide per hour per 100 parts catalyst solution. In this and the other examples the non-hydroperoxide material in the impure hydroperoxide supplied to the process and the cumene in the hydroperoxide solution added to the catalyst solution are included in the catalyst solution for computing this rate of mixing hydroperoxide and catalyst solution.

The hydroperoxide material treated by the process of this example was obtained in known manner by the liquid phase air oxidation of cumene and distillation of the oxidation product to recover a fraction in which the $\alpha,\alpha$-dimethylbenzyl hydroperoxide was concentrated.

*Example 2.*—A solution of 0.5 part cobalt stearate in 150 parts cumene was heated in a vessel externally heated at 100° C. and 61.3 parts of a 62% $\alpha,\alpha$-dimethylbenzyl hydroperoxide added thereto over a period of one hour. The maximum reaction temperature attained was 103° C. The material was heated for an additional 3 hours. A pool of the product thus obtained, containing bis($\alpha,\alpha$-dimethylbenzyl) peroxide, was heated to reflux under 221 mm. Hg pressure (about 100° C.). A 78.3% $\alpha,\alpha$-dimethylbenzyl hydroperoxide product, the same as used in Example 1, at the rate of 100 parts per hour and a solution of 5 parts cobalt stearate in 1000 parts cumene at the rate of 173 parts per hour were fed to the pool. The pool was maintained at temperatures in the range 96° C. to 103° C. Material was removed from the pool at a rate equal to the rate of additional materials thereto. When a steady state with respect to the composition of the pool of materials was attained, the withdrawn material was taken off as product of this continuously operating process and treated for the recovery of bis($\alpha,\alpha$-dimethylbenzyl) peroxide in the same manner as the product of Example 1. A 45.5% yield of bis($\alpha,\alpha$-dimethylbenzyl) peroxide was obtained, based on the $\alpha,\alpha$-dimethylbenzyl hydroperoxide in the feed during withdrawal of product.

During the steady-state operation of this process, the concentration of Co catalyst in the pool of reaction mixture was about 0.03%. The ratio by weight of hydroperoxide to cumene supplied to the process was about 0.4/1. The rate of mixing the hydroperoxide with catalyst solution was about 38 parts hydroperoxide per 100 parts catalyst solution per hour.

*Example 3.*—In a manner similar to that described in Example 1, a solution of 0.5 part cobalt naphthenate, containing 0.05 part Co, in 150 parts cumene was heated to 95° C. To this solution there was added over a period of 40 minutes 61.3 parts of a 62% $\alpha,\alpha$-dimethylbenzyl hydroperoxide product of the liquid phase oxidation of cumene, while maintaining the heated materials at temperatures in the range of about 102°–105° C. and stirring to disperse the hydroperoxide in the catalyst solution. After completion of the addition of the hydroperoxide followed by maintaining the materials at temperatures within that range for a further period of 20 minutes, only a trace of $\alpha,\alpha$-dimethylbenzyl hydroperoxide was left in the reaction product. From this reaction product a purified bis($\alpha,\alpha$-dimethylbenzyl) peroxide was recovered in a 47.4% yield, based on the hydroperoxide supplied to the process.

In this process, the concentration of Co catalyst in the reaction mixture ranged from 0.033% at the start to 0.024% at the end of the addition of the hydroperoxide. The ratio by weight of hydroperoxide to cumene supplied to the process was 0.22/1. The rate of mixing the hydroperoxide with catalyst solution was about 33 parts hydroperoxide per 100 parts catalyst solution per hour.

*Example 4.*—To 0.25 part cobalt stearate solution in 50 parts cumene at 85° C., 179 parts of a 6.1% $\alpha,\alpha$-dimethylbenzyl hydroperoxide solution in cumene are added with stirring, over a period of one-half hour, during which the temperature of heating was increased to 97° C. A half hour after completion of the addition of peroxide and maintaining the 97° C. temperature, over 95% of the hydroperoxide had decomposed. At the end of an additional one hour heating at 97° C., 97.5% of the hydroperoxide had been decomposed.

A reaction mixture thus produced was evaporated under a reduced pressure of 2 mm. Hg to remove volatile components and leave a residue of 10.3 parts. This residue was dissolved in methanol, the solution cooled in a Dry Ice acetone bath and the resulting crystals of crude bis($\alpha,\alpha$-dimethylbenzyl) peroxide were dried. The yield of this product was 67 weight percent based on the $\alpha,\alpha$-dimethylbenzyl hydroperoxide. Recrystallization of this crude product from a solution in methanol treated with active carbon, gave a 55.9 weight percent yield of pure bis($\alpha,\alpha$-dimethylbenzyl) peroxide.

In this example a very low concentration of $\alpha,\alpha$-dimethylbenzyl hydroperoxide, at all times substantially below 5%, was present in the reaction mixture. The ratio by weight of hydroperoxide to cumene supplied to the process was about .05/1. Even under these conditions, a surprisingly high yield of bis($\alpha,\alpha$-dimethylbenzyl) peroxide was obtained. The concentration of Co catalyst in the reaction mixture ranged from about .047% at the start to about .011% after completion of the addition of the cumene solution of hydroperoxide. The rate of mixing the hydroperoxide with the catalyst solution was about 10 parts hydroperoxide per 100 parts catalyst solution per hour.

Any of the cobaltous or cobaltic salts sufficiently soluble in cumene to provide the required quantity of Co in solution in the reaction mixture employed may be used in carrying out our process. We prefer, however, to use the salts of the organic acids. That cobalt is a specific catalyst for the conversion of $\alpha,\alpha$-dimethylbenzyl hydroperoxide dispersed in cumene to the bis($\alpha,\alpha$-dimethylbenzyl) peroxide, has been shown by substituting vanadium naphthenate and ferric oleate in equivalent amounts with respect to the metal of these salts for the cobalt in processes essentially similar to those of Examples 1 and 3 above. In so doing, these metal salts were found ineffective for the production of the peroxide from the hydroperoxide.

We claim:

1. The process for producing bis($\alpha,\alpha$-dimethylbenzyl) peroxide which comprises dispersing $\alpha,\alpha$-dimethylbenzyl hydroperoxide in a solution of a cobalt salt in cumene containing about .01% to about .05% by weight of Co, at a temperature in the range about 85° C. to about 110° C. and in amounts by weight such that no more than about one part of the hydroperoxide is dispersed in every one part cumene, maintaining the resulting reaction mixture at reaction temperature in said range of about 85° C. to about 110° C. until substantially all of said hydroperoxide has reacted, and thereafter recovering from the reaction mixture bis($\alpha,\alpha$-dimethylbenzyl) peroxide.

2. The process of claim 1 in which about 0.05 to 0.04 part of the hydroperoxide is dispersed in every one part cumene.

3. The process of claim 1 in which the $\alpha,\alpha$-dimethylbenzyl hydroperoxide is first dissolved in cumene and the solution of the hydroperoxide is added to and dispersed in the solution of the cobalt salt in cumene at a temperature in the range about 85° C. to about 100° C.

4. The process of claim 3 in which the solutions of the $\alpha,\alpha$-dimethylbenzyl hydroperoxide in cumene and of the cobalt salt in cumene are mixed at a rate not substantially greater than about 50 parts hydroperoxide per 100 parts soltion of the catalyst (both by weight) per hour.

5. The process for producing bis(α,α-dimethylbenzyl) peroxide which comprises dispersing α,α-dimethylbenzyl hydroperoxide in a solution of a cobalt salt of an organic acid in cumene containing about .01% to about .05% by weight of Co, at a temperature in the range about 85° C. to about 110° C. and in amounts by weight such that no more than about one part of the hydroperoxide is dispersed in every one part cumene, maintaining the resulting reaction mixture at reaction temperature in said range of about 85° C. to about 110° C. until substantially all of said hydroperoxide has reacted, and thereafter recovering from the reaction mixture bis(α,α-dimethylbenzyl) peroxide.

6. The process of claim 5 in which the cobalt salt is cobalt stearate and the reaction mixture is maintained at reaction temperature until at least about 95% of the α,α-dimethylbenzyl hydroperoxide has reacted.

7. The process of claim 5 in which the cobalt salt is cobalt naphthenate and the reaction mixture is maintained at reaction temperature until at least about 95% of the α,α-dimethylbenzyl hyperperoxide has reacted.

8. The process of claim 5 in which about 0.05 to 0.04 part of the hydroperoxide is dispersed in every one part cumene.

9. The process of claim 5 in which the α,α-dimethylbenzyl hydroperoxide is first dissolved in cumene and the solution of the hydroperoxide is added to and dispersed in the solution of the cobalt salt in cumene at a temperature in the range about 85° C. to about 100° C.

10. The process of claim 9 in which the solutions of the α,α-dimethylbenzyl hydroperoxide in cumene and of the cobalt salt in cumene are mixed at a rate not substantially greater than about 50 parts hydroperoxide per 100 parts solution of the catalyst (both by weight) per hour.

References Cited in the file of this patent
UNITED STATES PATENTS 2,687,438     Lorand et al. _____ Aug. 24, 1954